(12) United States Patent
Glose et al.

(10) Patent No.: US 11,398,788 B2
(45) Date of Patent: Jul. 26, 2022

(54) DRIVE CONTROL FOR A THREE-PHASE MOTOR

(71) Applicant: Bayerische Motoren Werke Aktiengesellschaft, Munich (DE)

(72) Inventors: Daniel Glose, Munich (DE); Pascal Schirmer, Seybothenreuth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 26 days.

(21) Appl. No.: 16/963,942

(22) PCT Filed: Feb. 21, 2019

(86) PCT No.: PCT/EP2019/054347
§ 371 (c)(1),
(2) Date: Jul. 22, 2020

(87) PCT Pub. No.: WO2019/192770
PCT Pub. Date: Oct. 10, 2019

(65) Prior Publication Data
US 2021/0044233 A1 Feb. 11, 2021

(30) Foreign Application Priority Data
Apr. 3, 2018 (DE) ...................... 10 2018 204 975.0

(51) Int. Cl.
*H02P 21/05* (2006.01)
*B60L 15/02* (2006.01)
(Continued)

(52) U.S. Cl.
CPC ............ *H02P 21/05* (2013.01); *B60L 15/025* (2013.01); *H02P 21/13* (2013.01); *H02P 27/12* (2013.01);
(Continued)

(58) Field of Classification Search
CPC .... H02M 7/53873; H02P 21/05; H02P 27/12; B60L 15/025
See application file for complete search history.

(56) References Cited

U.S. PATENT DOCUMENTS

| 6,819,078 B2* | 11/2004 | Ho | .................... H02M 7/53873 318/808 |
| 2007/0103950 A1* | 5/2007 | Arisawa | ............ H02M 7/53875 363/132 |

(Continued)

FOREIGN PATENT DOCUMENTS

| CN | 103825529 B | 4/2015 |
| DE | 10 2012 210 644 A1 | 12/2013 |

OTHER PUBLICATIONS

International Search Report (PCT/ISA/210) issued in PCT Application No. PCT/EP2019/054347 dated May 10, 2019 with English translation (five pages).
Hari et al., "Space-vector-based hybrid pulse width modulation technique to reduce line current distortion in induction motor drives", The Institution of Engineering and Technology, 2012, pp. 1463-1471, vol. 5, No. 8, IET Power Electronics, nine pages.

(Continued)

*Primary Examiner* — Said Bouziane
(74) *Attorney, Agent, or Firm* — Crowell & Moring LLP

(57) ABSTRACT

A drive control for a three-phase motor has an inverter with multiple switches for generating three-phase voltages on the windings of the three-phase motor, and a control device for controlling the switches of the inverter on the basis of pulse-width modulation. The control device is set up to control the switches in a switching period by using a switching pattern, wherein the switching pattern is composed of two active voltage space vectors and multiple null vectors, wherein the null vectors vary within the switching pattern.

12 Claims, 3 Drawing Sheets

(51) Int. Cl.
   *H02P 21/13*   (2006.01)
   *H02P 27/12*   (2006.01)
(52) U.S. Cl.
   CPC ... *B60L 2240/421* (2013.01); *B60L 2240/423* (2013.01); *B60L 2260/42* (2013.01)

(56) References Cited

U.S. PATENT DOCUMENTS

2008/0169780 A1   7/2008  Pirozzi et al.
2008/0258673 A1* 10/2008  Welchko ................ H03K 7/04
                                                                318/811
2014/0233289 A1*  8/2014  Zhao ................... H02M 7/5395
                                                                363/131

OTHER PUBLICATIONS

Reddy et al., "Simplified SVPWM Based Hybrid PWM for Induction Motor drives for the Reduction of Torque Ripples", Chennai and Dr.MGR University Second International Conference on Sustainable Energy and Intelligent System (SEISCON 2011), Jul. 20-22, 2011, pp. 512-517, six pages.

English Translation of German-language Written Opinion (PCT/ISA/237) issued in PCT Application No. PCT/EP2019/054347 dated May 10, 2019 (seven pages).

Machine Translation of German-language Office Action issued in German Application No. 10 2018 204 975.0 dated Nov. 14, 2018 (four pages).

\* cited by examiner

DRIVE CONTROL FOR A THREE-PHASE MOTOR

BACKGROUND AND SUMMARY OF THE INVENTION

The present invention relates to a drive controller for a three-phase motor. The present invention further relates to a three-phase motor, in particular for a motor vehicle, comprising a drive controller of this kind.

In the field of three-phase motors, drive arrangements are used to ensure that there is a defined orientation of the flux density distribution in the three-phase motor. Pulse width modulation of an input signal is usually employed here. In order to be able to continuously (sinusoidally) commutate a three-phase motor, also called a three-phase machine, voltage space vector modulation is performed in an inverter in particular. An inverter of this kind can have a half-bridge for each of the three phases of the three-phase motor. As a result, the output voltages of the three phases are applied both to the positive and also to the negative intermediate circuit potential. The intermediate circuit constitutes the transition from an input voltage source to the inverter.

Each half-bridge can assume two different switch positions. Since three half-bridges are required for a three-phase system, $2^3$ possible switch positions and therefore 8 switching states are produced as a result. Each active switch position corresponds to a different voltage configuration between the phases and therefore also to a different voltage space vector. In this case, a voltage space vector defines the flux density distribution in the machine by way of two variables, specifically the angle of the voltage space vector and its magnitude. The two switch positions, in which either all three upper or all three lower switches are closed, are referred to as zero voltage space vectors, zero vectors or passive voltage space vectors.

Therefore, six active and two passive voltage space vectors can be produced from these switch positions. The six active basic voltage space vectors are not sufficient in order to be able to continuously commutate a three-phase motor since voltage space vectors with arbitrary angles and magnitudes have to be connected to the machine. Pulse width modulation can be used in order to achieve this. Two voltage space vectors can be output alternately in order to output an arbitrary voltage space vector. The period which is applied to each voltage space vector depends on the switching frequency of the modulation and the angular position of the voltage space vector. The resulting voltage space vector is defined by the ratio of the two times. In the three-phase motor, this output of the voltage space vectors produces a mean current and therefore the desired voltage space vector, i.e. the desired orientation of the magnetic flux density.

In order to also be able to select the amplitude of the output voltage, that is to say the magnitude of the voltage space vector, as desired, not only are two voltage space vectors output alternately, but these are supplemented by a zero vector. The magnitude of the resulting voltage space vector can be reduced owing to this zero vector. The magnitude of the resulting voltage space vector depends on the ratio of the switch-on time of the active voltage space vectors and the switch-on time of the zero vector. The three or four voltage space vectors (and therefore switch positions) involved are therefore pulse-width-modulated.

In previous systems, the output of any desired voltage space vectors is subdivided into three or four periods of time for each switching period. The two active voltage space vectors are output in two of these periods of time, and a zero vector is output in the third and, respectively, fourth period of time. In these known modulation methods, a selection is made in accordance with the operating point, wherein an operating point corresponds to a combination of two voltage space vectors. This means that there is always a specific combination of two voltage space vectors and one or two zero vectors for each phase angle $\pi/3$. When generating the phases for the three-phase motor, current harmonics also occur in addition to the desired oscillation of the current. These current harmonics can lead to losses within the entire operating characteristic map, it not being possible to avoid these losses owing to this modulation and driving of the three-phase motor.

Against this background, an object of the present invention is to improve the driving of three-phase motors, wherein current harmonics are intended to be reduced in particular.

This object is achieved by a drive controller for a three-phase motor as is proposed in the text which follows. The drive controller comprises an inverter having a plurality of switches for generating three-phase voltages at the windings of the three-phase motor, and a control device for controlling the switches of the inverter based on pulse width modulation. The inverter can be, in particular, a six-pulse bridge circuit which consists of three half-bridges, each having an upper and a lower switch.

In order to improve the driving of the three-phase motor in comparison to the known drive arrangements, the control device according to the present drive controller is designed to control the switches in a switching period using a switching pattern, wherein the switching pattern consists of two active voltage space vectors and a plurality of zero vectors, wherein the plurality of zero vectors vary within the switching pattern.

In this case, a switching period corresponds to an operating state which is defined by a specific combination of two active voltage space vectors. Therefore, the rotation speed and the torque of the three-phase motor is defined for each operating state since these are determined by the two active voltage space vectors and the plurality of zero vectors. In this case, a switching period corresponds to an angle of $\pi/3$ of the three-phase signal.

According to the proposed drive controller, a combination of two active voltage space vectors and a plurality of zero vectors is used, wherein the type and the number of zero vectors in a fundamental period can vary. In contrast to this, in known systems, only a combination of two active voltage space vectors and one or more zero vectors is used in a fundamental period, wherein these do not vary in a fundamental period. According to the drive controller proposed here, the plurality of zero vectors can change within one voltage period. Here, a combination of two active voltage space vectors and one zero vector can be used, wherein the zero vector changes within the voltage period. As an alternative, a combination of two active voltage space vectors and a plurality of zero vectors can be used, wherein the zero vectors likewise change within the voltage period. These two options can also be combined.

The harmonics of the generated three-phase signal can be optimized by way of using a plurality of and/or different zero vectors in a voltage period. During a switching period, the values of the voltage space vectors can be adjusted, by way of corresponding selection of the zero vectors, such that these voltage space vectors correspond to the real voltage space vectors, i.e. the voltage space vectors which are achieved by simply switching the switches. Since the losses owing to harmonics are very low in these cases, the losses and harmonics of the generated three-phase signal can therefore be reduced by way of suitable use of the zero vectors.

Since current harmonics do not produce a usable torque, the utilization of the three-phase motor is reduced owing to the percentage proportion of harmonics. Furthermore, harmonics generate an increased thermal loading and therefore reduce the maximum possible continuous output. This can be improved by the proposed drive controller since the harmonics can be reduced.

According to one embodiment, the switching pattern is inverted during a switching period. In this case, invert means that the active voltage space vectors are maintained and the one or more zero vectors are inverted. Here, the switching pattern can be inverted at least once during the switching period. The switching pattern is preferably inverted in half the switching period. The signals which are applied to the three-phase motor are therefore inverted periodically. It has been established that the losses can be reduced when inverting the zero vectors. The zero vectors can preferably be inverted at $\pi/6$ since this causes an optimum reduction in the losses.

According to a further embodiment, a switching pattern defines a division and/or a number of zero vectors.

The switching pattern therefore defines how many zero vectors are used in a switching period and how these are divided. For example, first a combination of the two active voltage space vectors and one first zero vector can be used in a switching period and then a combination of the two active voltage space vectors and a second different zero vector can be used in the same switching period.

According to a further embodiment, the drive controller has a calculation unit for calculating the zero vectors for each operating state of the three-phase motor and for storing the zero vectors.

Owing to this calculation unit, the possible switching states for each operating state can already be calculated in advance, independently of the three-phase motor. An operating state has a specific rotation speed and a specific torque which are defined by the active voltage space vectors and the sum of the zero vectors. Since the switching states, or the zero vectors for each operating state, are stored, rapid access to this information during operation of the three-phase motor is possible without being restricted by the calculation.

In particular, the calculation unit can be designed to calculate the plurality of zero vectors offline. Owing to this offline calculation, calculation of the zero vectors can also take longer, without this having an adverse effect on the operation of the three-phase motor. Furthermore, the offline calculation can already be performed once at the factory or before delivery of the drive controller.

In one embodiment, the calculation unit can be designed to store the one or more zero vectors in a lookup table. A lookup table provides a particularly simple way of storing the zero vectors since no further processing operation is required here for selecting the zero vectors during operation, but rather only the zero vectors for the corresponding operating state or the switching period have to be selected.

According to a further embodiment, the calculation unit is designed to calculate the one or more zero vectors based on an optimization algorithm, wherein the optimization algorithm is suitable for reducing the losses of the three-phase motor over the entire operating range.

The selection of the optimization algorithm can depend, amongst other things, on the available computational capacity or how quickly the algorithm should run. In each case, optimization is performed over the entire operating range, i.e. over all operating states, in order to reduce the sum of the losses of the three-phase motor. A corresponding algorithm can be selected depending on the available computational and time resources. In particular, the optimization algorithm can be suitable for reducing the losses of the three-phase motor on the machine side or on the intermediate circuit side. The intermediate circuit constitutes the transition from an input voltage source to the inverter.

Various numerical algorithms can be used as optimization algorithms. These include, for example, the following algorithms: "exhaustive search", "complete parameter variation", "minimum search" or else the "descendent gradient method".

The optimization algorithm can be identical for the intermediate circuit side and the machine side. However, the voltage fluctuations should be reduced for the intermediate circuit. There may be a conflict of objectives between the optimization of the machine side and of the intermediate circuit side. Therefore, in this case, either the machine side or the intermediate circuit side can be optimized.

A further aspect proposes a three-phase motor, in particular for a motor vehicle, comprising a drive controller as described above.

A further aspect proposes a method for driving a three-phase motor. The method comprises the following steps: generating three-phase voltages at the windings of the three-phase motor by means of an inverter having a plurality of switches, and controlling the switches of the inverter based on pulse width modulation, wherein the switches are controlled in a switching period using a switching pattern, wherein the switching pattern consists of two active voltage space vectors and a plurality of zero vectors, wherein the plurality of zero vectors vary within the switching pattern.

The embodiments and features described for the proposed apparatus apply to the proposed method in a corresponding manner.

The invention further proposes a computer program product which has a program code which is designed to cause the method as explained above to be carried out on a computer.

A computer program product, such as e.g. a computer program, can be provided or supplied, for example, as a storage medium, such as e.g. a memory card, USB stick, CD-ROM, DVD, or else in the form of a downloadable file from a server in a network. This can be effected, for example, in a wireless communication network by means of the transmission of an appropriate file with the computer program product or the computer program means.

Further possible implementations of the invention comprise combinations, which are not explicitly cited either, of features or embodiments described above or below with respect to the exemplary embodiments. In this case, a person skilled in the art will also add individual aspects to the respective basic form of the invention as improvements or additions.

Further advantages and advantageous embodiments are specified in the description, the drawings and the claims. The combinations of features specified in the description and in the drawings are, in particular, purely exemplary here, and therefore the features may also be present individually or in a manner combined in some other way.

The invention will be described in more detail below with reference to exemplary embodiments illustrated in the drawings. The exemplary embodiments and the combinations shown in the exemplary embodiments are purely exemplary and are not intended to define the scope of protection of the invention. This is defined solely by the appended claims.

BRIEF DESCRIPTION OF THE DRAWINGS

Identical or functionally identical elements are identified using the same reference signs in the text which follows.

DETAILED DESCRIPTION OF THE DRAWINGS

Figure 1:
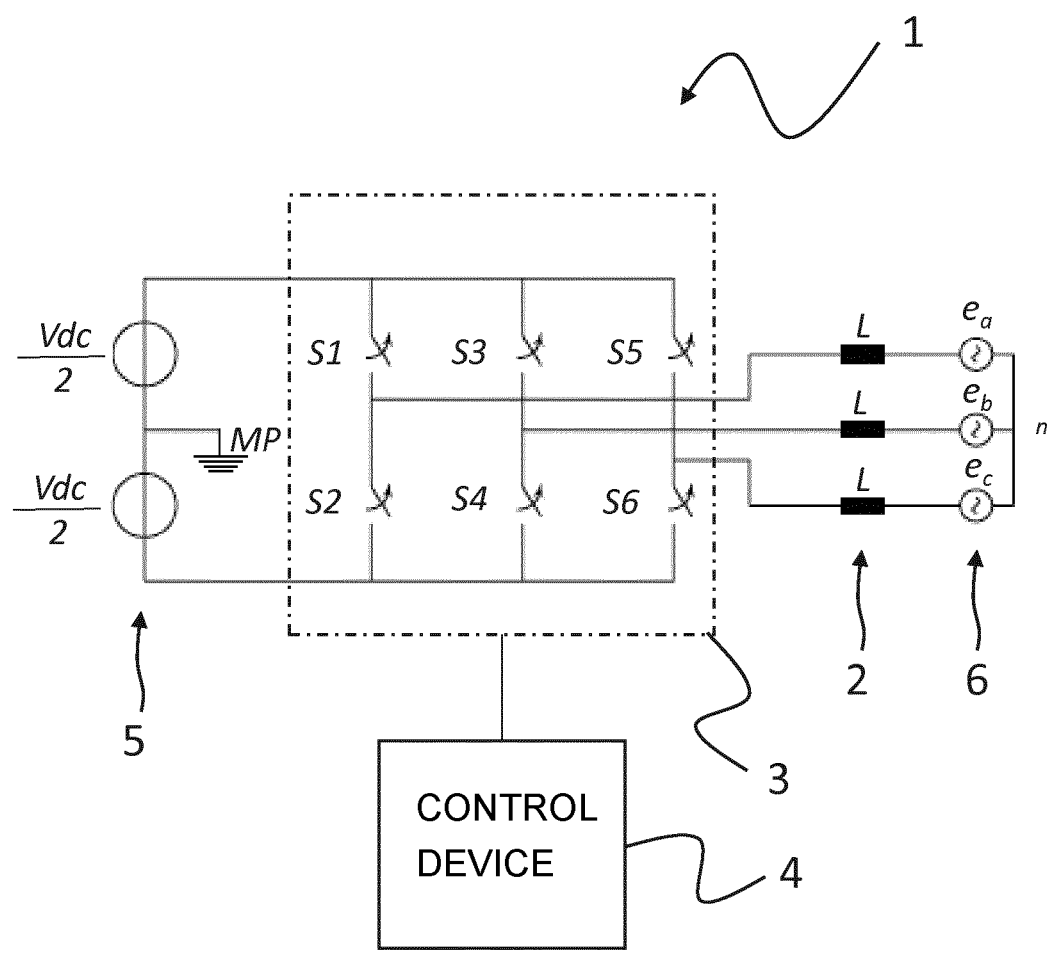
FIG. 1 is a schematic diagram of a drive controller for a three-phase motor.

FIG. 1 shows a drive controller 1 for a three-phase motor 2. Here, the three-phase motor 2 is illustrated in an idealized manner by three coils L1 to L3 and the back-EMFs $e_a$ to $e_c$ which represent the three windings of the three-phase motor 2.

In order to obtain a defined orientation of the flux density distribution in the three-phase motor 2, pulse width modulation of an input signal, which originates from an input voltage source 5, is employed in an inverter 3. In particular, voltage space vector modulation is performed.

The inverter 3 has a half-bridge for each of the three phases 6 of the three-phase motor 2. The first half-bridge is formed by the switches S1, S2, the second half-bridge is formed by the switches S3, S4 and the third half-bridge is formed by the switches S5, S6. As a result, the output voltages of the three phases 6 can be applied both to the positive and also to the negative intermediate circuit potential. The intermediate circuit constitutes the transition from the input voltage source 5 to the inverter 3.

Each half-bridge of the inverter 3 can assume two different switch positions. Since three half-bridges are required for a three-phase system, $2^3$ possible switch positions and therefore 8 switching states are produced as a result. Each active switch position corresponds to a different voltage configuration between the phases 6 and therefore also to a different voltage space vector. In this case, a voltage space vector defines the flux density distribution in the three-phase motor 2 by way of two variables, specifically the angle of the voltage space vector and its magnitude.

A control device 4 is provided in order to drive the inverter 3 and its switches S1 to S6. In order to improve the driving of the three-phase motor 2 in comparison to known drive arrangements, the control device 4 is designed to control the switches S1 to S6 in a switching period using a specific, predefined switching pattern. In this case, the switching pattern consists of two active voltage space vectors and a plurality of zero (null) vectors, wherein the plurality of zero vectors vary within the switching pattern. In order to optimize the three-phase signal produced, in particular in order to reduce harmonics, since these cause distortions in the signals, the switching patterns used can be optimized using the zero vectors. Various, suitable optimization algorithms can be used for this purpose.

Figure 2:
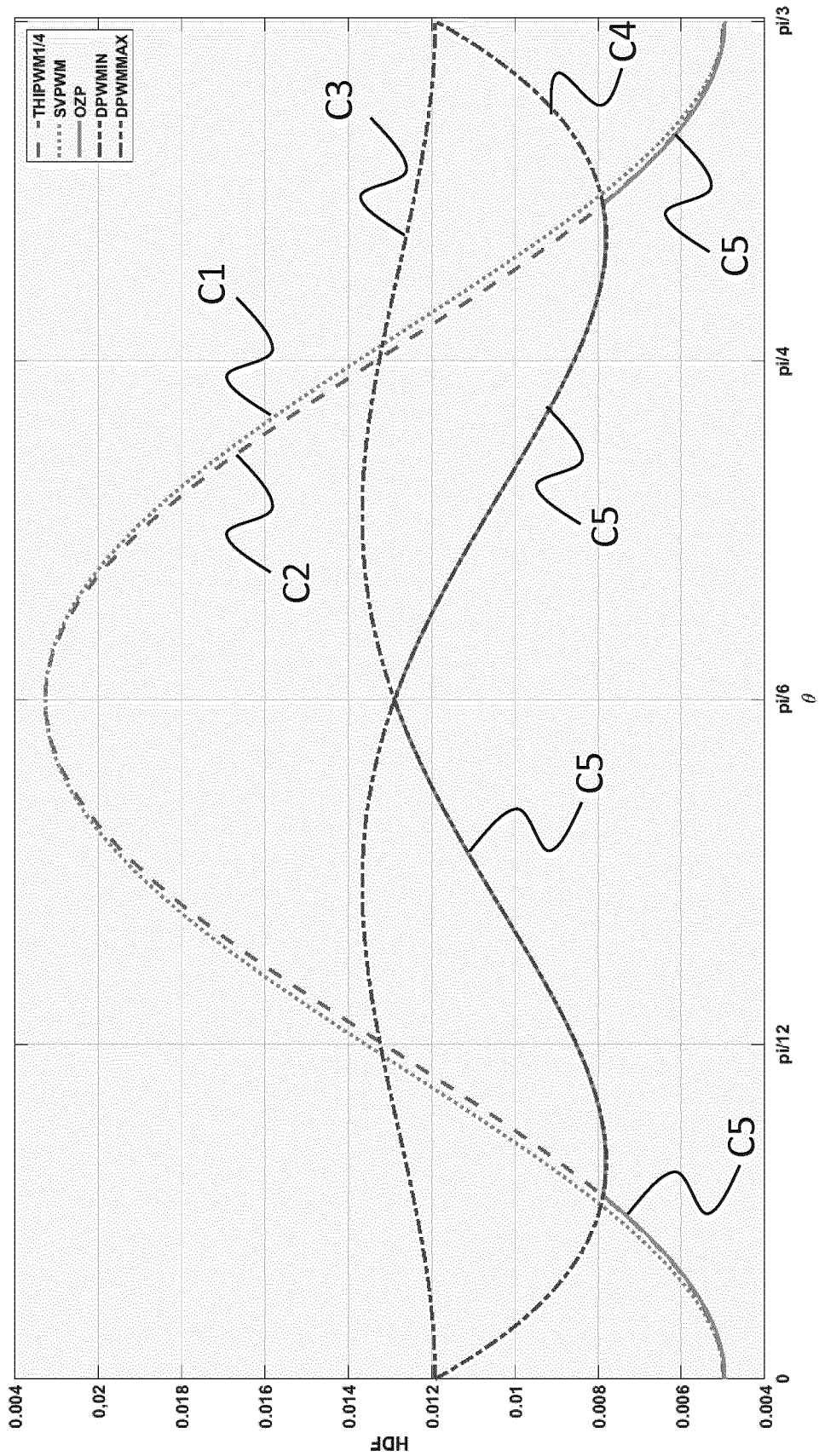
FIG. 2 is a graph of the modulation curves depending on the phase angle.
Figure 3:
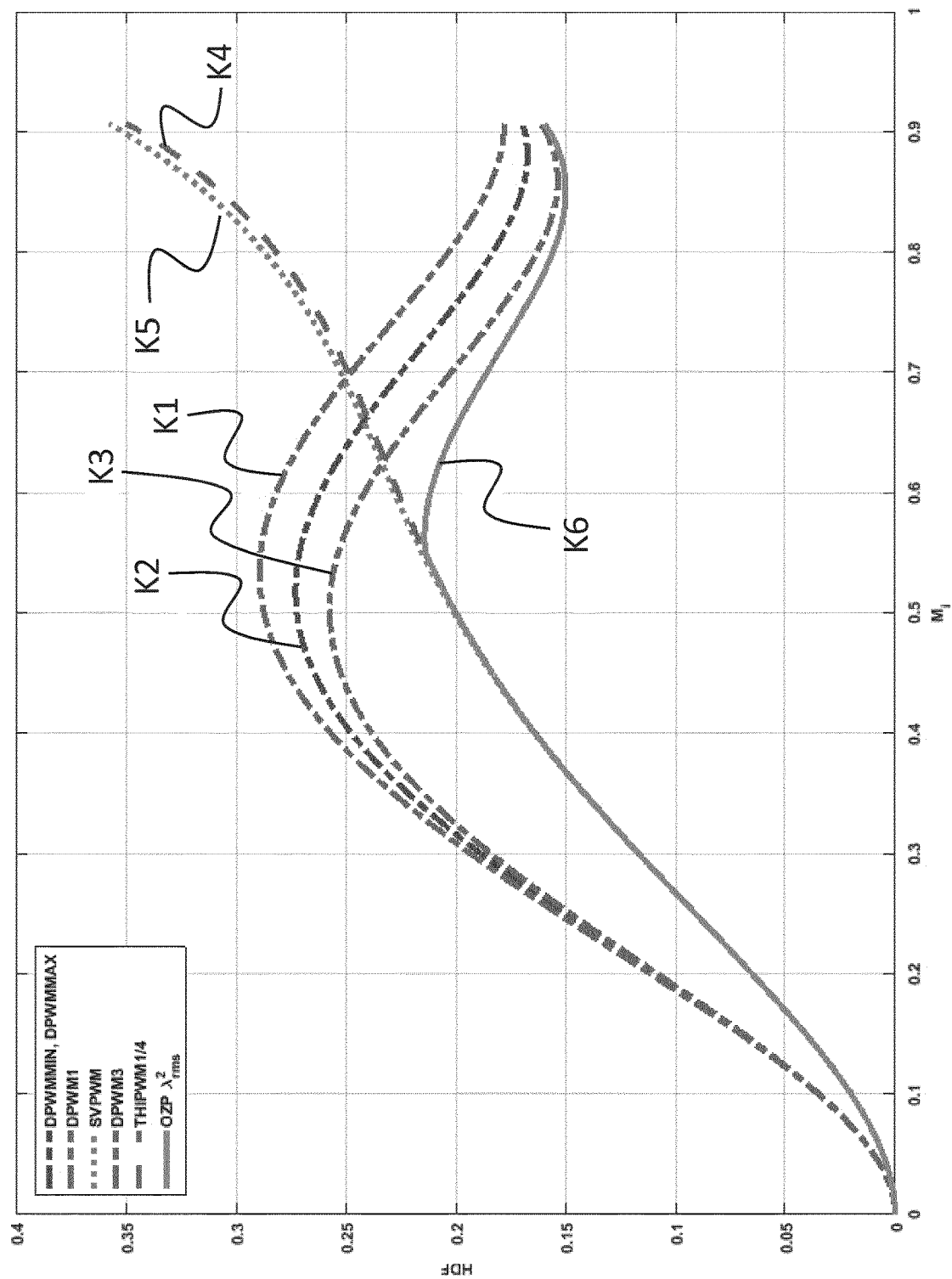
FIG. 3 is a graph of the modulation curves depending on the modulation index.

FIGS. 2 and 3 show modulation curves for various modulation methods. In this case, FIG. 2 shows the change in the angle θ of the signals with respect to the harmonic distortion factor (HDF) and FIG. 3 shows the modulation index $M_i$ with reference to the harmonic distortion factor (HDF). The modulation index $M_i$ is understood to be a standardized inverter output voltage (inverter modulation) here.

FIGS. 2 and 3 firstly show modulation curves for discontinuous modulation methods. These include the DPWMMIN (discontinuous minimum PWM), DPWMMAX (discontinuous maximum PWM), DPWM1 (discontinuous PWM) and DPWM3 (discontinuous 30° PWM) methods which each use one zero vector. Modulation curves for continuous modulation methods are also shown. These include the SVPWM (space vector PWM) and THIPWM1/4 (third harmonic PWM) modulation methods which use two zero vectors. The modulation method, as is employed by the control device described in FIG. 1, is referred to as OZP in FIGS. 2 and 3. Here, the number of zero vectors within a switching period changes depending on the modulation, the angle and the frequency.

Curves C1 and K5 relate to SWPWM modulation. Curves C2 and K4 relate to THIPWM1/4 modulation. Curves C3/C4 and K2 relate to DPWMMIN/DPWMMAX modulation. Curve K3 relates to DPWM3 modulation. Curve K1 relates to DPWM1 modulation.

As shown in FIGS. 2 and 3, a reduction in the distortion factor is achieved by the modulation (OZP) as is performed by the drive controller 1 of FIG. 1. This is indicated by curve C5 in FIG. 2 and curve K6 in FIG. 3. As shown in the figures, curve C5 and, respectively, K6 is optimized by corresponding optimization algorithms, which can be used in order to calculate the zero vectors, such that the distortion factor HDF is at the lowest in comparison to the existing modulation methods.

The harmonics of the generated three-phase signal can be optimized by way of using a plurality of and/or different zero vectors in a voltage period. The distortion of the output signal can be reduced in this way.

REFERENCE SIGNS

1 Drive controller
2 Three-phase motor
3 Inverter
4 Control device
5 Input voltage source
6 Output phases
C1-C4 Modulation curves depending on the phase angle
$e_a$-$e_c$ Back-EMFs
K1-K6 Modulation curves depending on the modulation index
L1-L3 Windings
S1-S6 Switches

What is claimed is:

1. A drive controller for a three-phase motor, comprising:
an inverter having a plurality of switches for generating three-phase voltages at windings of the three-phase motor; and
a processor for controlling the plurality of switches of the inverter based on pulse width modulation, wherein
the processor controls the plurality of switches in a switching period using a switching pattern, wherein the switching pattern consists of two active voltage space vectors and a plurality of zero vectors, wherein the plurality of zero vectors vary within the switching pattern, and
wherein the switching pattern is inverted during a switching period such that the active voltage space vectors are maintained while the plurality of zero vectors are inverted.

2. The drive controller according to claim 1, wherein
a switching pattern defines a division of the zero vectors and/or a number of zero vectors.

3. The drive controller according to claim 1,
wherein the processor calculates the zero vectors for each operating state of the three-phase motor and stores the zero vectors.

4. The drive controller according to claim 3, wherein an operating state has a specific rotation speed and a specific torque.

5. The drive controller according to claim 4, wherein the processor calculates the zero vectors offline.

6. The drive controller according to claim 5, wherein the processor stores the zero vectors in a lookup table.

7. The drive controller according to claim 3, wherein the processor calculates the zero vectors offline.

8. The drive controller according to claim 3, wherein the processor stores the zero vectors in a lookup table.

9. The drive controller according to claim 3, wherein
the processor calculates the zero vectors based on an optimization algorithm, and
the optimization algorithm is suitable for reducing losses of the three-phase motor over an entire operating range.

10. The drive controller according to claim 9, wherein the optimization algorithm is suitable for reducing the losses of the three-phase motor on a machine side or on an intermediate circuit side.

11. A three-phase motor comprising a drive controller according to claim 1.

12. The drive controller according to claim 11, wherein the three-phase motor is a motor vehicle three-phase motor.

\* \* \* \* \*